Figure 1:
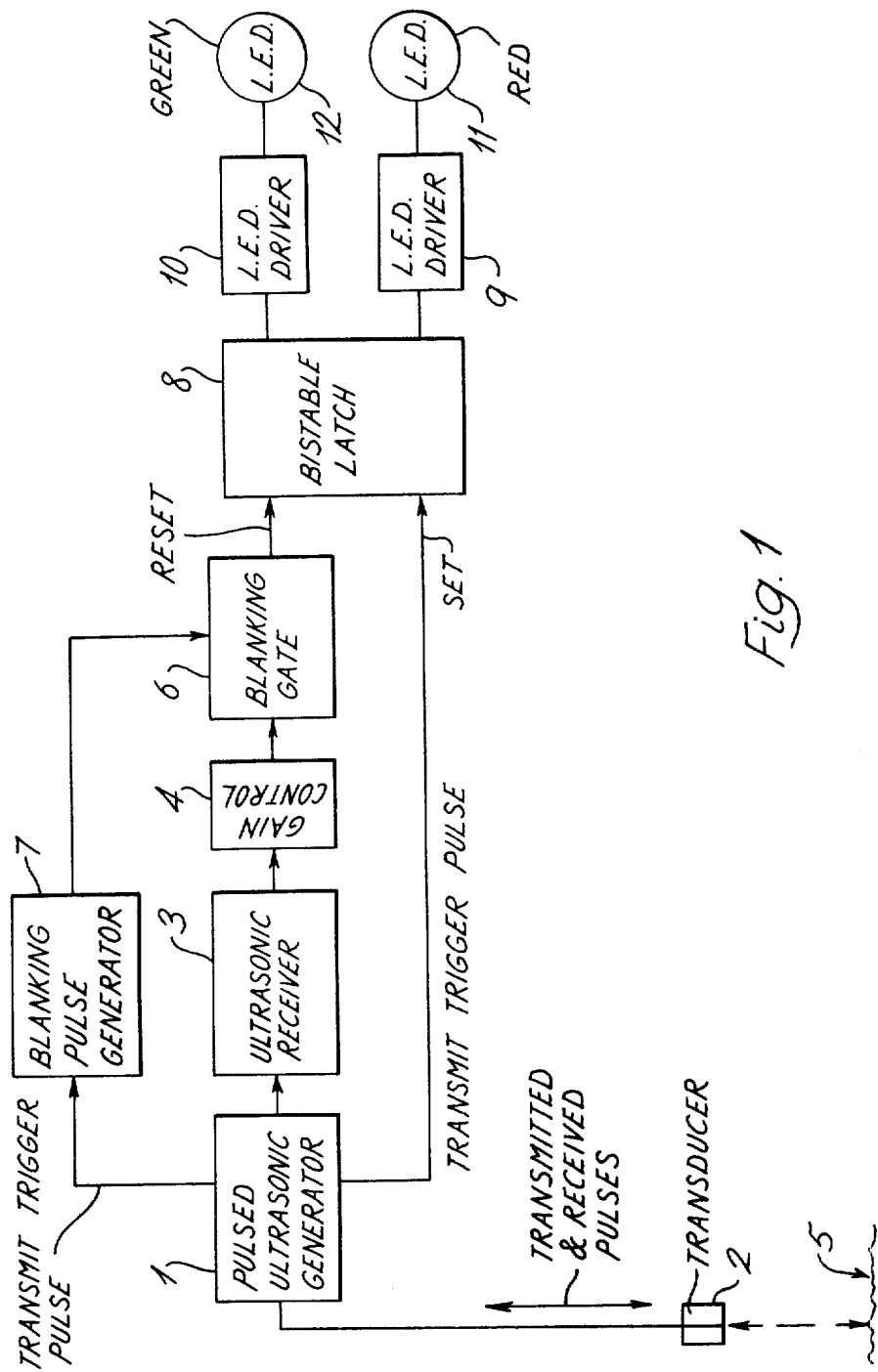

United States Patent [19]

Baird

[11] 4,247,924

[45] Jan. 27, 1981

[54] PROXIMITY INDICATING EQUIPMENT

[75] Inventor: Albert A. Baird, Southampton, England

[73] Assignee: National Research Development Corporation, London, England

[21] Appl. No.: 17,145

[22] Filed: Mar. 2, 1979

[30] Foreign Application Priority Data

Mar. 8, 1978 [GB] United Kingdom ............... 09188/78

[51] Int. Cl.³ ............................................. G01S 15/14
[52] U.S. Cl. .................................... 367/110; 367/111
[58] Field of Search ............... 367/110, 111, 112, 114, 367/909

[56] References Cited

U.S. PATENT DOCUMENTS

| 3,125,754 | 3/1967 | Reumerman et al. | 367/111 |
| 3,412,390 | 11/1968 | Nelkin et al. | 367/110 |
| 3,548,370 | 12/1970 | Hoxsie | 367/114 |
| 3,740,705 | 6/1973 | Lowrance | 367/112 |
| 3,787,803 | 1/1974 | Beebe | 367/114 |
| 4,064,478 | 12/1977 | Honda | 367/111 |

Primary Examiner—Richard A. Farley
Attorney, Agent, or Firm—Cushman, Darby & Cushman

[57] ABSTRACT

A proximity indicator, for example to indicate a safe height of release of a lifeboat, uses pulsed sonar to trigger a bistable circuit into a set state by the transmitted pulses and a reset state by received pulses which exceed a predetermined level. Red and green LEDs are energized when the bistable is set and reset respectively so that green predominates when a safe height is reached.

1 Claim, 5 Drawing Figures

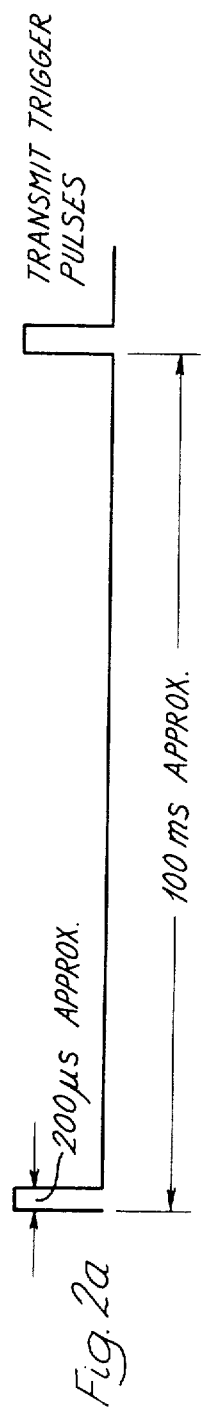
Fig. 2a — TRANSMIT TRIGGER PULSES, 200 μs APPROX., 100 ms APPROX.
Fig. 2b — RECEIVER OUTPUT AFTER BLANKING
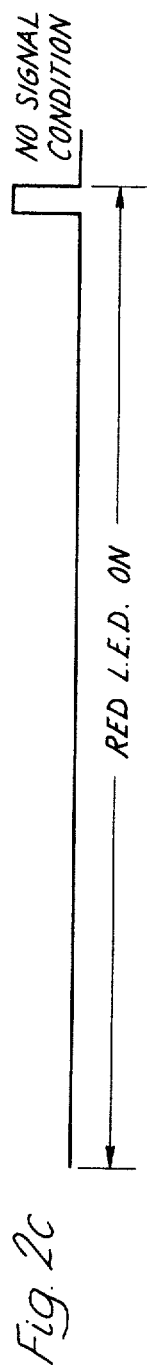
Fig. 2c — NO SIGNAL CONDITION, RED L.E.D. ON
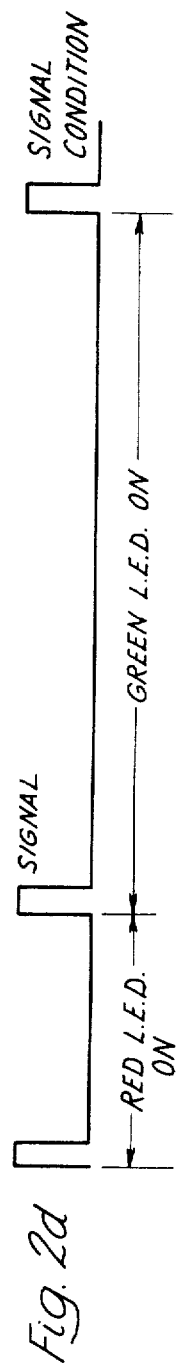
Fig. 2d — SIGNAL CONDITION, SIGNAL, GREEN L.E.D. ON, RED L.E.D. ON

PROXIMITY INDICATING EQUIPMENT

This invention relates to proximity indicating equipment. It is particularly concerned with indicating whether the distance between the equipment and a position spaced apart therefrom is greater or less than a predetermined magnitude.

The problem arises in connection with on load lifeboat launching gear provided on ships or oil rigs. Clearly the boat must not be released at too great a height or else a catastrophic situation may occur. This problem is compounded in a rough seaway. A safe height for release is probably not greater than 2 to 4 meters from the surface.

According to the invention proximity indicating equipment comprises a pulsed sonar transmitter, a sonar receiver, a bistable circuit set by trigger pulses from the transmitter and reset by pulses received in the receiver and means for indicating the state of the bistable circuit.

Preferably a gain control circuit is included in the receiver for passing only received signals above a predetermined level.

In carrying out the invention a blanking circuit may be provided in the receiver for blanking pulses from the transmitter.

Suitable means for indicating the state of the bistable circuit may comprise differently colored light emitting diodes.

In use of the invention the transmitter is set up to provide short pulses with a long interval between successive pulses for example of the order of 100 milliseconds or more.

In order that the invention may be more fully understood reference will now be made to the accompanying drawings in which:

FIG. 1 illustrates a circuit in block diagrammatic form embodying the invention, and FIGS. 2a, 2b, 2c and 2d show waveforms illustrative of the invention.

Referring now to FIG. 1 there is shown therein proximity indicating equipment comprising a pulsed generator 1 which generates an alternating signal of ultrasonic frequency and passes its output to a transducer 2 which emits a sonar signal of corresponding frequency and envelope. Signals reflected back from a distant reflecting surface 5, which may for example be the surface of the sea, are detected in transducer 2 and passed to an ultrasonic receiver 3. Receiver 3 incorporates a gain control 4 which may be preset. The output from receiver 3 will have a similar form to the output of ultrasonic generator 1, but will be displaced therefrom in time by an amount proportional to the distance between transducer 2 and the sea. Since the power of the transmitted pulse is very much greater than that of the received pulse, the transmitter pulse will break through into the receiver channel and will also appear at the output of receiver 3. In order to blank off this pulse a blanking gate 6 is provided. This gate is controlled by a blanking pulse generator 7 which closes the gate in synchronism with trigger pulses obtained from pulse generator 1. Accordingly the output from blanking gate 6 consists of the received pulse only and does not include any transmitter breakthrough.

The respective output from blanking gate 6 (comprising the received pulses) and a trigger pulse from pulse generator 1 (corresponding to the transmitter pulses) are both applied to a bistable latch circuit 8. The transmitter trigger pulses set the latch into one state while the receiver pulses reset the latch back into its original state.

Bistable latch 8 has two outputs one of which is energised in its set state and the other of which is energised in its reset state. The respective outputs are applied to LED drivers 9 and 10 which are respectively connected to energise light emitting diodes 11 and 12. LED 11 is energised when the bistable latch is set and emits a red light while LED 12 is energized when the bistable latch is reset and emits a green light.

The operation of the circuit will be apparent from a consideration of FIG. 2. This figure shows at A the envelopes of the transmit sonar pulses which have a duration of approximately 200 microseconds and are provided every 100 milliseconds. The received pulses obtained by reflection from a distant object have an envelope which corresponds to the envelope of the waveform shown at A but will be displaced therefrom in time depending on the distance of the reflecting surface from the transducer. This waveform is shown at B. The waveform B does not include any transmitter breakthrough in the receiver channel since this will have been eliminated by blanking gate 6. The two inputs to bistable latch 8 thus are the waveform A and waveform B. The effect of a pulse on the set line to bistable latch 8 as indicated by waveform A will be to switch on the red LED and if no signals are received at all as indicated at C, then the red LED will remain alight thus giving a warning that the distance between the transducer and the reflector is well above the minimum safety level. If weak received signals are obtained from a distant object, then these signals will be eliminated by the level to which the gain control 4 is set in the receiver and accordingly such distant received signals will have no effect and the red warning light will remain on. As a lifeboat is lowered towards the sea reflections will begin to be received by transducer 2. As the lifeboat approaches the surface of the sea the strength of the reflected signals will increase and the time interval between the transmitted and reflected pulses will decrease. Accordingly a condition will be reached in which the red LED and the green LED are switched on alternately as shown at D and this will appear as flickering red and green lights. This is an indication that the safe distance is approaching. When the distance has been reduced to about 3 meters then the green light will predominate and very soon the red light will become effectively invisible and only the green light will indicate. This shows that it is now safe to release the lifeboat.

An advantage of the arrangement described above is that it gives early indication that safe release is possible in a rough seaway. As the crest of a wave approaches the indicators will change from red to flashing red and green and at this instant it will be safe to release the lifeboat since the crest of a wave is indicated as approaching.

In use the equipment is mounted inside the lifeboat with the transducer positioned facing downwards in the bottom of the boat and operating through the hull. The equipment indicates when it is safe to release the boat from the falls. The equipment can be interlocked with the falls release mechanism so that release is not possible until a safe indication is given.

In order to prevent spurious random pulses from triggering bistable latch 8 to indicate green a circuit may be included, for example in the reset line to latch 8, which only passes pulses after several consecutive pulses are received.

A further safety feature is a time lock circuit which operates to continue to hold the red LED driver 9 energized at a preset time after the generation of a transmit trigger pulse if driver 9 is then energized. This prevents any switch to green when the lifeboat is still too high due to variations in amplitude of the received signals. The preset time is related to the maximum safe release height.

It is advantageous to incorporate short delay circuits, of say 1 second, in the inputs to the drivers to prevent loss of indication on momentary loss of echo signals.

I claim:

1. Proximity indicating equipment comprising a pulsed sonar transmitter, a sonar receiver, a gain control circuit included in said receiver for passing only received signals above a predetermined level corresponding to echoes from less than a predetermined distance, a bistable circuit set by trigger pulses from the transmitter and reset by pulses that pass through said gain control circuit, and means indicating the state of the bistable circuit comprising differently colored light emitting diodes which are respectively energized in the set and reset states thereof so as to indicate when only one color is visible a distance greater than said predetermined distance and when only the other color is visible a distance less than the said predetermined distance and when both colors alternate a distance substantially equal to the said predetermined distance.

* * * * *